US012587733B2

(12) United States Patent
Yoshimi

(10) Patent No.: US 12,587,733 B2
(45) Date of Patent: Mar. 24, 2026

(54) DISPLAY CONTROL METHOD FOR AN IMAGE PICKUP APPARATUS

(71) Applicant: CANON KABUSHIKI KAISHA, Tokyo (JP)

(72) Inventor: Takashi Yoshimi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 18/507,919

(22) Filed: Nov. 13, 2023

(65) Prior Publication Data

US 2024/0163547 A1     May 16, 2024

(30) Foreign Application Priority Data

Nov. 16, 2022    (JP) ................................. 2022-183492

(51) Int. Cl.
*H04N 23/63*      (2023.01)
*H04N 23/611*     (2023.01)

(52) U.S. Cl.
CPC ......... *H04N 23/631* (2023.01); *H04N 23/611* (2023.01); *H04N 23/633* (2023.01)

(58) Field of Classification Search
CPC .... H04N 23/611; H04N 23/62; H04N 23/631; H04N 23/632; H04N 23/633
See application file for complete search history.

(56) References Cited

U.S. PATENT DOCUMENTS

| | | | | |
|---|---|---|---|---|
| 10,582,096 B2 * | 3/2020 | Misawa | .................. | H04N 23/51 |
| 10,674,072 B1 * | 6/2020 | Manzari | ................. | H04N 23/74 |
| 12,293,645 B2 * | 5/2025 | Cornell | ................ | G08B 13/194 |
| 2009/0104942 A1* | 4/2009 | Arakane | ............... | G06F 1/1679 |
| | | | | 455/566 |
| 2013/0050556 A1* | 2/2013 | Lee | ......................... | H04N 23/64 |
| | | | | 348/E5.022 |
| 2015/0015690 A1* | 1/2015 | Roh | ........................ | G10L 15/26 |
| | | | | 348/77 |
| 2015/0085157 A1* | 3/2015 | Yamaguchi | .......... | G06V 40/174 |
| | | | | 348/333.06 |
| 2015/0116362 A1* | 4/2015 | Aurongzeb | ........... | G06F 3/1446 |
| | | | | 345/650 |
| 2015/0138321 A1* | 5/2015 | Yamamoto | ........... | H04N 23/633 |
| | | | | 348/222.1 |

(Continued)

FOREIGN PATENT DOCUMENTS

| | | | | |
|---|---|---|---|---|
| JP | 2014022850 A | * | 2/2014 | |
| JP | 2016106311 A | * | 6/2016 | |

*Primary Examiner* — Antoinette T Spinks
(74) *Attorney, Agent, or Firm* — Canon U.S.A., Inc., IP Division

(57)          ABSTRACT

A controller performs control to display a predetermined item at a display position in a first layout and display the predetermined item in a first display form, in a case where a positional relationship of a display unit with respect to a main body of an image pickup apparatus is a first positional relationship, and performs control to display the predetermined item at a display position in a second layout different from the first layout and display the predetermined item in a second display form in which the image displayed together with the predetermined item is more easily viewed than in the first display form, in a case where the positional relationship of the display unit with respect to the main body of the image pickup apparatus is a second positional relationship.

12 Claims, 6 Drawing Sheets

(56) References Cited

U.S. PATENT DOCUMENTS

| | | | | |
|---|---|---|---|---|
| 2018/0115718 A1* | 4/2018 | Nakamura | ............. | H04N 25/00 |
| 2019/0089873 A1* | 3/2019 | Misawa | ................. | H04N 23/51 |
| 2023/0345114 A1* | 10/2023 | Nishimura | ........... | H04N 23/635 |

* cited by examiner

DISPLAY CONTROL METHOD FOR AN IMAGE PICKUP APPARATUS

BACKGROUND

Technical Field

The present disclosure relates to an image pickup apparatus including a display unit capable of changing the position with respect to the image pickup apparatus.

Description of the Related Art

There are known image pickup apparatuses each provided with a movable display unit, such as a vari-angle liquid crystal display monitor or a tilt liquid crystal display monitor. Many of those each also have a touch panel function. A user can make various settings, set automatic focus (AF), and perform image capturing by touching icons and a live view screen on a touch panel on a movable display unit flipped to face the user (a subject), who is trying to capture the image of himself or herself.

Japanese Patent Application Laid-Open No. 2014-22850 discusses an image pickup apparatus that displays icons in a positional relationship that varies according to a positional relationship of a movable display unit with respect to its main body so that an icon to be touched is displayed at a position for a user to perform a touch operation easily.

Depending on the positional relationship between a movable display unit and a housing unit, touching the display surface of the movable display unit can be hindered by the housing unit, resulting in poor operability. For example, with a display screen of a movable display unit on the back of an image pickup apparatus being brought into a position facing a user, it may be difficult for the user to touch positions on the display unit, close to the main body of the image pickup apparatus due to the image pickup apparatus that becomes an obstacle to the user.

The issue of the difficulty of touching the display surface of the movable display unit due to the housing unit that becomes an obstacle is not considered in Japanese Patent Application Laid-Open No. 2014-22850.

SUMMARY

The present disclosure is directed to a further improved operability in touching a display unit when a positional relationship between the image pickup apparatus and the display unit is changed.

According to an aspect of the present disclosure, an image pickup apparatus includes a display unit including a display screen that detects a touch operation and configured to change a position with respect to a main body of the image pickup apparatus, and a controller configured to control display to display a picked-up image and a predetermined item to be operated by touch on the display screen. The controller performs control to display the predetermined item at a display position in a first layout and display the predetermined item in a first display form, in a case where a positional relationship of the display unit with respect to the main body of the image pickup apparatus is a first positional relationship, and to display the predetermined item at a display position in a second layout different from the first layout and display the predetermined item in a second display form in which the image displayed together with the predetermined item is more easily viewed than in the first display form, in a case where the positional relationship of the display unit with respect to the main body of the image pickup apparatus is a second positional relationship.

Further features of the present disclosure will become apparent from the following description of exemplary embodiments with reference to the attached drawings.

DESCRIPTION OF THE EMBODIMENTS

A digital camera 100 will be described with reference to the drawings as an example of an image pickup apparatus according to an exemplary embodiment of the present disclosure.

<Configuration of Digital Camera 100>

Figure 1:
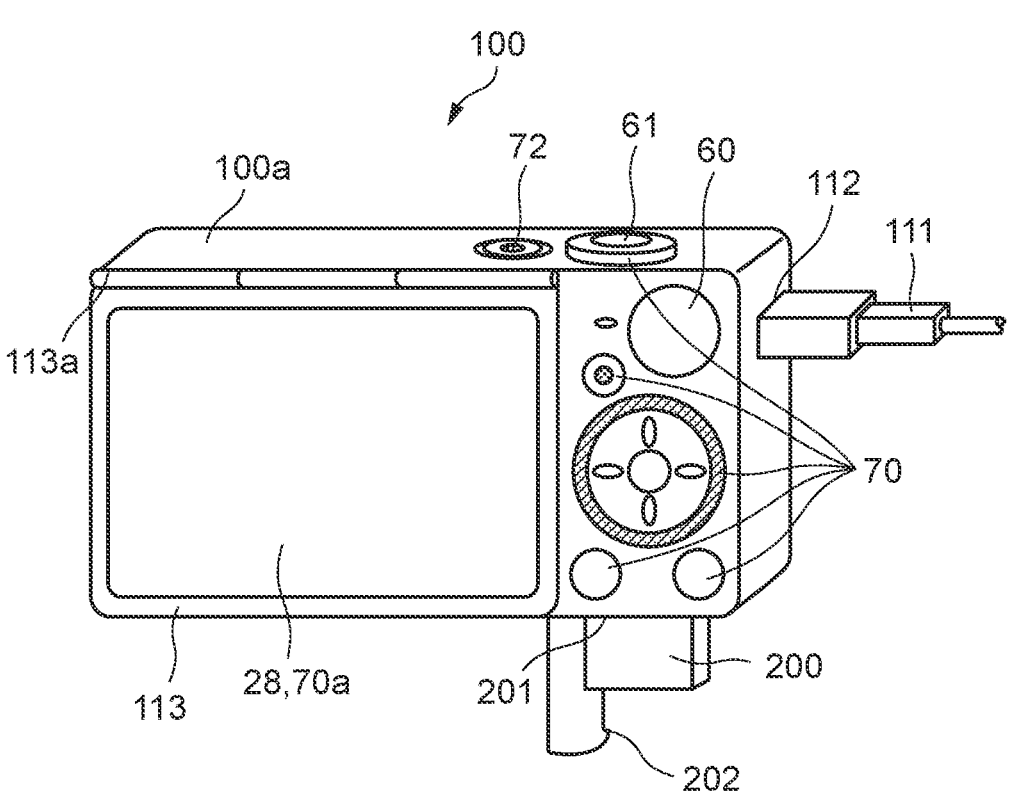
FIG. 1 is an external view of a digital camera according to an exemplary embodiment of the present disclosure.
Figure 2:
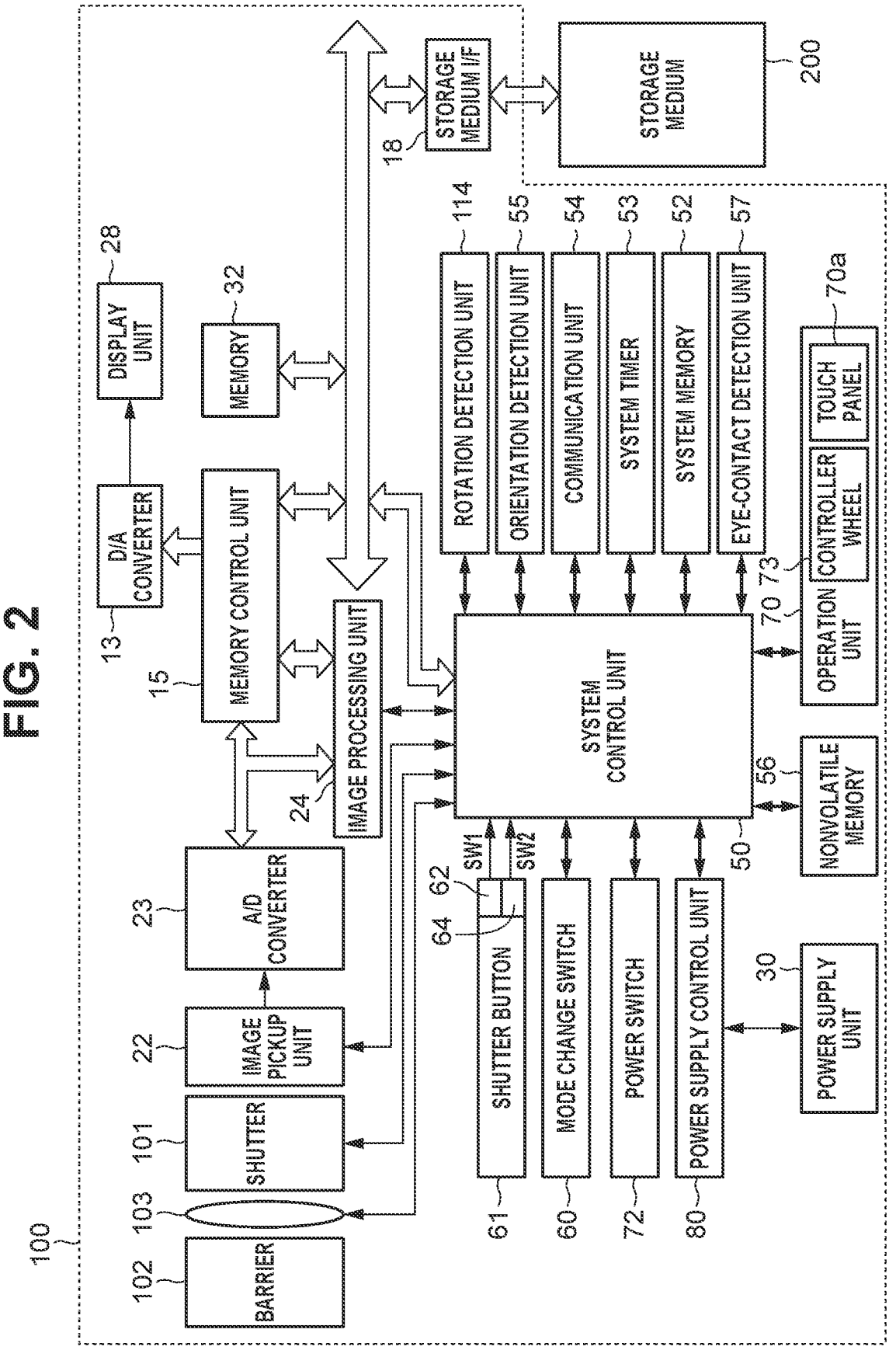
FIG. 2 is a functional block diagram illustrating a configuration of the digital camera according to the exemplary embodiment of the present disclosure.
Figure 3:
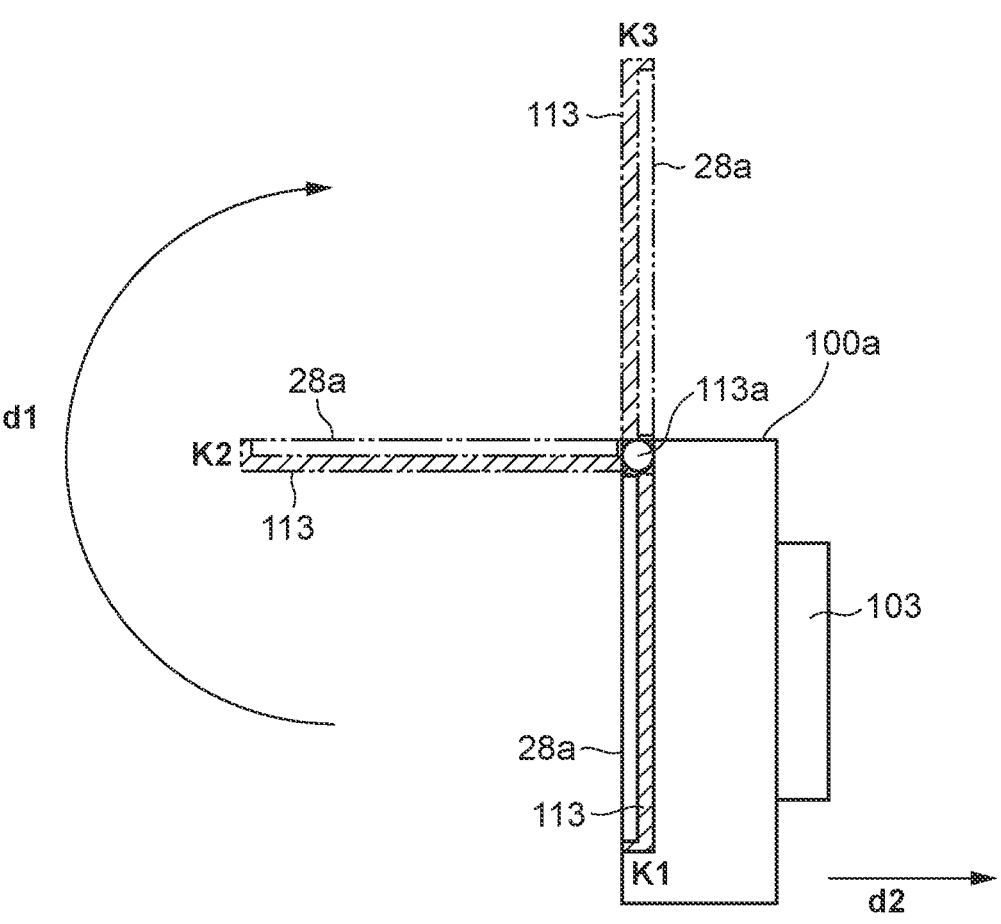
FIG. 3 is a diagram illustrating the structure of a vari-angle monitor unit.

FIG. 1 to FIG. 3 illustrate a configuration of the digital camera 100 according to the present exemplary embodiment of the present disclosure.

FIG. 1 illustrates an external view of the digital camera 100.

A vari-angle monitor unit 113 (a monitor unit) is attached to be rotatable about a rotation shaft 113a disposed along one side on the upper of the back of the digital camera 100, and can change the position with respect to the digital camera 100. The vari-angle monitor unit 113 includes a display unit 28. The display unit 28 is a display unit that displays images and various kinds of information.

A shutter button 61 is an operation portion for giving an image capturing instruction. A mode change switch 60 is an operation portion for switching between various modes. A connector 112 is a connector between a connection cable 111 for connecting the digital camera 100 to an external apparatus, such as a personal computer or a printer. An operation unit 70 is an operation unit consisting of operation members, such as various switches, buttons, and a touch panel for receiving various operations from a user. A controller wheel 73 is an operation member that is included in the operation unit 70 and can be rotationally operated. A power switch 72 is a push button for switching between power-on and power-off. A storage medium 200 is a storage medium, such as a memory card or a hard disk. A storage medium slot 201 is a slot for storing the storage medium 200. The storage medium 200 stored in the storage medium slot 201 can communicate with the digital camera 100, allowing recording and playback. A lid 202 is the lid of the storage medium slot 201. FIG. 1 illustrates a part of the storage medium 200 exposed from the storage medium slot 201 with the lid 202 open.

FIG. 2 is a block diagram illustrating an example of a configuration of the digital camera 100 according to the present exemplary embodiment.

In FIG. 2, an image capturing lens 103 is a lens group including a zoom lens and a focus lens. A shutter 101 is a shutter provided with an aperture function. An image pickup unit 22 is an image sensor composed of a charge-coupled device (CCD), a complementary metal-oxide semiconductor (CMOS) device, or the like that converts optical images into electrical signals. An analog-to-digital (A/D) converter 23 converts analog signals into digital signals. The A/D converter 23 is used to convert analog signals output from the image pickup unit 22 into digital signals. A barrier 102 covers an image pickup system including the image capturing lens 103 in the digital camera 100, preventing the image pickup system including the image capturing lens 103, the shutter 101, and the image pickup unit 22 from being contaminated and damaged.

An image processing unit 24 performs predetermined pixel interpolation, resize processing, such as reduction, and color conversion processing on data from the A/D converter 23 or data from a memory control unit 15. The image processing unit 24 performs predetermined computation processing using picked-up image data, and a system control unit 50 performs exposure control and ranging control based on the calculation result. Through-the-lens (TTL) type automatic focus (AF) processing, automatic exposure (AE) processing, and electronic flash (EF) processing (pre-flash) are thereby performed. Further, the image processing unit 24 performs predetermined computation processing using the picked-up image data, and also performs TTL type automatic white balance (AWB) processing based on the calculation result. Furthermore, the image processing unit 24 performs face detection of detecting a face (person) included in a captured image using the picked-up image data. The face detection can identify the size and position of the detected face, and notify the system control unit 50 of the result of the face detection.

Output data from the A/D converter 23 is written into a memory 32 via the image processing unit 24 and the memory control unit 15, or directly written into the memory 32 via the memory control unit 15. The memory 32 stores image data obtained by the image pickup unit 22 and converted into digital data by the A/D converter 23, and image data to be displayed on the display unit 28. The memory 32 has a sufficient capacity to store a predetermined number of still images and a predetermined time of a moving image and sound.

The memory 32 is also used as a memory (video memory) for image display. A digital-to-analog (D/A) converter 13 converts data for image display stored in the memory 32 into analog signals and supplies the analog signals to the display unit 28. Thus, the image data for display written in the memory 32 is displayed by the display unit 28 via the D/A converter 13. The display unit 28 performs display on a display device, such as a liquid crystal display (LCD), based on analog signals from the D/A converter 13. The digital signals that are subjected to the AD conversion once by the A/D converter 23 and stored in the memory 32 are converted into analog signals by the D/A converter 13, and the analog signals are sequentially transferred to the display unit 28 for display, allowing live image display (live view display).

A nonvolatile memory 56 is an electrically erasable and recordable memory. For example, an electrically erasable programmable read-only memory (EEPROM) is used as the nonvolatile memory 56. The nonvolatile memory 56 stores constants and programs for operation of the system control unit 50. The programs used herein include a computer program for performing processing in a flowchart to be described below in the present exemplary embodiment.

The system control unit 50 generally controls the digital camera 100. The system control unit 50 runs programs recorded in the nonvolatile memory 56 described above, carrying out each process to be described below according to the present exemplary embodiment. A random access memory (RAM) is used as a system memory 52. Constants, variables, programs read from the nonvolatile memory 56 for operation of the system control unit 50 are loaded into the system memory 52. The system control unit 50 also performs display control by controlling the memory 32, the D/A converter 13, the display unit 28, and other units.

A system timer 53 is a time measurement unit for measuring times to be used for various kinds of control and of a built-in clock.

The mode change switch 60, the shutter button 61, and the operation unit 70 are operation means for inputting various operation instructions to the system control unit 50.

The mode change switch 60 changes the operating mode of the system control unit 50 to one of such modes as a still image capturing mode, a moving image capturing mode, and a playback mode. Modes included in the still image capturing mode are an automatic image capturing mode, an automatic scene determination mode, a manual mode, various scene modes for image capturing settings for different image capturing scenes, a program AE mode, and a custom mode. These modes in a menu button can be directly switched to any mode of these modes with the mode change switch 60. Alternatively, after switching to the menu button once using the mode change switch 60, the user may change to one of these modes included in the menu button using another operation member. Similarly, a plurality of modes may be included in the moving image capturing mode.

A first shutter switch 62 is turned on when the shutter button 61 of the digital camera 100 is being operated, i.e., when the shutter button 61 is half-pressed (image capturing preparation instruction), and generates a first shutter switch signal SW1. Operations, such as AF processing, AE processing, AWB processing, EF processing (pre-flash), start in response to the first shutter switch signal SW1.

A second shutter switch 64 is turned on when an operation of the shutter button 61 is completed, i.e., when the shutter button 61 is full-pressed (image capturing instruction), and generates a second shutter switch signal SW2. In response to the second shutter switch signal SW2, the system control unit 50 starts a series of image capturing processing operations from signal reading from the image pickup unit 22 to writing image data to the storage medium 200.

Each operation member of the operation unit 70 is appropriately assigned a function for each situation, for example, by an operation of selecting from various function icons displayed on the display unit 28, and then acts as various function buttons. Function buttons include an end button, a return button, an image forward button, a jump button, a narrowing-down button, and an attribute change button. For example, when the menu button is pressed, a menu screen for enabling various settings is displayed on the display unit 28. The user can intuitively make various settings using the menu screen displayed on the display unit 28, a four-direction button for four directions of up, down, left, and right, and a SET button.

The controller wheel 73 is an operation member included in the operation unit 70 and rotationally operable, and is used together with the direction button, for example, for giving an instruction to select an item. When the controller wheel 73 is rotationally operated, an electrical pulse signal is generated based on an operation amount, and the system control unit 50 controls units of the digital camera 100 based on this pulse signal. The angle corresponding to a rotation of the controller wheel 73, the number of rotations, and the like can be determined based on this pulse signal. The controller wheel 73 may be any type of member as long as the member is an operation member of which a rotational operation is detectable. For example, the controller wheel 73 may be a dial operation member that generates pulse signals while the controller wheel 73 itself rotates according to a rotation operation by a user. Further, the controller wheel 73 may be an operation member including a touch sensor (so-called a touch wheel) that detects a rotational or another operation with a finger of a user on the controller wheel 73 while the controller wheel 73 itself does not rotate.

A power supply control unit 80 includes a battery detection circuit, a direct current to direct current (DC-DC) converter, and a switch circuit for switching blocks to be energized, and detects attachment/detachment of a battery, the type of the battery, and a remaining battery capacity. The power supply control unit 80 controls the DC-DC converter based on detection results and instructions from the system control unit 50, and supplies voltages to units including the storage medium 200 for certain periods of time.

A power supply unit 30 includes a primary battery, such as an alkaline battery or a lithium battery, a secondary battery, such as nickel-cadmium (NiCd) battery, a nickel metal hydride (NiMH) battery, or lithium ion (Li) battery, and an alternating current (AC) adapter. A storage medium interface (I/F) 18 is an interface with the storage medium 200, such as a memory card or a hard disk. The storage medium 200 is a storage medium, such as a memory card for recording captured images, and is a semiconductor memory, an optical disk, a magnetic disk, or the like.

A communication unit 54 is connected wirelessly or via a wired cable, and transmits and receives video signals and audio signals. The communication unit 54 can also be connected to a wireless local area network (LAN) or the Internet. The communication unit 54 can transmit images (including a live view image) picked up (or captured) by the image pickup unit 22 and images recorded in the storage medium 200, and can receive image data and other various kinds of information from an external apparatus.

An orientation detection unit 55 detects the orientation of the digital camera 100 with respect to the direction of the gravity. Based on the orientation detected by the orientation detection unit 55, it is possible to determine whether an image picked up by the image pickup unit 22 is an image captured with the digital camera 100 held horizontally, or an image captured with the digital camera 100 held vertically. The system control unit 50 can attach orientation information corresponding to the orientation detected by the orientation detection unit 55 to an image file of an image picked up by the image pickup unit 22, and can record an image in a rotated state. An acceleration sensor, a gyro sensor, or the like can be used as the orientation detection unit 55.

The operation unit 70 includes a touch panel 70a that can detect touch operations performed on the display unit 28. The touch panel 70a and the display unit 28 can be integrated. For example, the touch panel 70a is configured such that the transmittance of light does not interrupt display of the display unit 28, and is attached at the upper layer of the display surface of the display unit 28. Further, input coordinates on the touch panel 70a and display coordinates on the display unit 28 are associated with each other. This makes it possible to configure a graphical user interface (GUI) as if the user could directly operate the screen displayed on the display unit 28. The system control unit 50 can detect the following operations or states on the touch panel 70a.

A finger or a pen that has not touched the touch panel 70a newly touches the touch panel 70a, that is, the start of touch (touch-down).

A finger or a pen is touching the touch panel 70a (touch-on).

A finger or a pen is moving on the touch panel 70a in the touched state (touch-move).

A finger or a pen touching the touch panel 70a is released from the touch panel 70a, that is, the end of touch (touch-up).

Nothing is touching the touch panel 70a (touch-off).

When a touch-down is detected, a touch-on is detected at the same time. After the touch-down is performed, normally, a touch-on continues being detected unless a touch-up is detected. A touch-move is also detected with a touch-on being detected. Even with a touch-on being detected, a touch-move is not detected unless the touch position is moving. When a touch-up of all the fingers or the pen that have or has touched the touch panel 70a is detected, a touch-off is detected. When the time from a touch-down to a touch-up is a predetermined time or less, a tap is detected at the same time.

These operations/states and the coordinates of the position on the touch panel 70a where a finger or a pen is touching are notified to the system control unit 50 via an internal bus. Based on the notified information, the system control unit 50 determines which type of operation is performed on the touch panel 70a. For a touch-move, the moving direction of the finger or the pen moving on the touch panel 70a can also be determined for both the vertical component and the horizontal component on the touch panel 70a based on a change in the coordinates of the position. Suppose that when a touch-up is performed through a fixed amount of a touch-move after a touch-down on the touch panel 70a is performed, a stroke is drawn. An operation of quickly drawing a stroke is called a flick. A flick is an operation of quickly moving a finger for a certain distance while touching the touch panel 70a and subsequently releasing the finger. In other words, a flick is an operation of quickly moving the finger on the touch panel 70a in a flipping manner. When a touch-move performed for a predetermined distance or more at a predetermined speed or more is detected and subsequently a touch-up is detected, it can be determined that a flick is performed. Further, when a touch-move performed for a predetermined distance or more at a speed less than a predetermined speed is detected, it is determined that a drag is performed. Furthermore, a touch operation of touching a plurality of locations (e.g., two points) simultaneously and moving these touch positions close to each other is called a pinch-in, and a touch operation of moving these touch positions away from each other is called a pinch-out. A pinch-in and a pinch-out are collectively called a pinch operation (or simply, pinch). The touch panel 70a may be any one among various types of touch panel, such as a resistive film type, an electrostatic capacitive type, a surface acoustic wave type, an infrared type, an electromagnetic induction type, an image recognition type, and a photosensor type. Some types include a type of detecting a touch when a contact is made on a touch panel and another type of detecting a tough when a finger or a pen approaches a touch panel, but any type can be used here.

A rotation detection unit 114 detects a rotation angle of the vari-angle monitor unit 113 with respect to a main body 100*a*, and is an angle detection unit that detects a rotation angle of the vari-angle monitor unit 113 described above.

FIG. 3 is a diagram illustrating a structure of the vari-angle monitor unit 113 on the digital camera 100.

FIG. 3 illustrates a state (a change in the positional relationship of the vari-angle monitor unit 113 with respect to the digital camera 100) of the digital camera 100 when the vari-angle monitor unit 113 (including the display unit 28) is turned about the rotation shaft 113*a*.

In FIG. 3, K1 shows a state (a rotation angle of 0 degrees) where the vari-angle monitor unit 113 is held in the digital camera 100. In the state of K1, a display screen 28*a* of the display unit 28 disposed in the vari-angle monitor unit 113 faces in the rearward direction opposite to an image capturing direction d2. K2 shows a state where the vari-angle monitor unit 113 is rotated 90 degrees in a direction d1 from the state of K1, and K3 shows a state where the vari-angle monitor unit 113 is rotated 180 degrees in the direction d1 from the state of K1.

FIG. 3 illustrates the vari-angle monitor unit 113 at each of the three angles in the digital camera 100 so as to show how the vari-angle monitor unit 113 rotates. However, in fact, the vari-angle monitor unit 113 can move to a position between a rotation angle of 0 degrees in the state of K1 and a rotation angle of 180 degrees in the state of K3. With the rotation angle of the vari-angle monitor unit 113 at 0 degrees (K1), the display direction of the display unit 28 is different from the image capturing direction d2, and the display screen 28*a* of the display unit 28 can be seen from the user side where the user observes in the image capturing direction d2, but the display screen 28*a* of the display unit 28 cannot be seen from the subject side where the subject is present in the image capturing direction d2. With the rotation angle of the vari-angle monitor unit 113 at 180 degrees (K3), the image capturing direction d2 and the display direction of the display unit 28 are the same, and the display on the display unit 28 can be seen from the subject side where the subject is present in the image capturing direction d2. The vari-angle monitor unit 113 is rotatable in the range of 0 degrees to 180 degrees. In the state of K3, the display screen 28*a* of the display unit 28 of the vari-angle monitor unit 113 faces in the image capturing direction d2, i.e., faces the subject. Further, the display unit 28 in the state of K3 is opposite to the display unit 28 in the state of K1 in terms of the up-down direction. When a live view image is displayed in the state of K3, the live view image thus is vertically reversed or rotated 180 degrees in comparison with the live view image displayed on the display unit 28 in the state of K1. In the state of K3, the vertically reversed or 180-degree rotated live view image makes it possible to match the up-down direction of the display unit 28 and the up-down direction of the live view image (match the top-bottom direction of the display unit and the top-bottom direction of the live view image). In the state of K3, the vertically reversed live view image is displayed like a mirror image. When the subject sees the live view image on the display unit 28 from the image capturing direction side (the subject side), the subject and the live view image are the same in the left-right direction, facilitating check of the composition by the subject. Whether to display the vertically reversed or 180-degree rotated live view image in the state of K3 may be switched depending on an ON/OFF setting for the mirror image display. With the mirror image display set to ON, the vertically reversed live view image is displayed in the state of K3. With the mirror image display set to OFF, the 180-degree rotated live view image is displayed in the state of K3. The mirror image display can be set to ON/OFF in response to a user operation performed in menu settings via an operation on the operation unit 70.

The rotation angle of the vari-angle monitor unit 113 will be hereinafter described on the premise that the rotation angle is 0 degrees in the state of K1, where the vari-angle monitor unit 113 is held in the digital camera 100, the rotation angle is 180 degrees in the state of K3, and the direction indicated by the arrow d1 in FIG. 3 is the forward direction of the rotation.

<Display Processing Based on Rotation State of Vari-Angle Monitor Unit 113>

Figure 4:
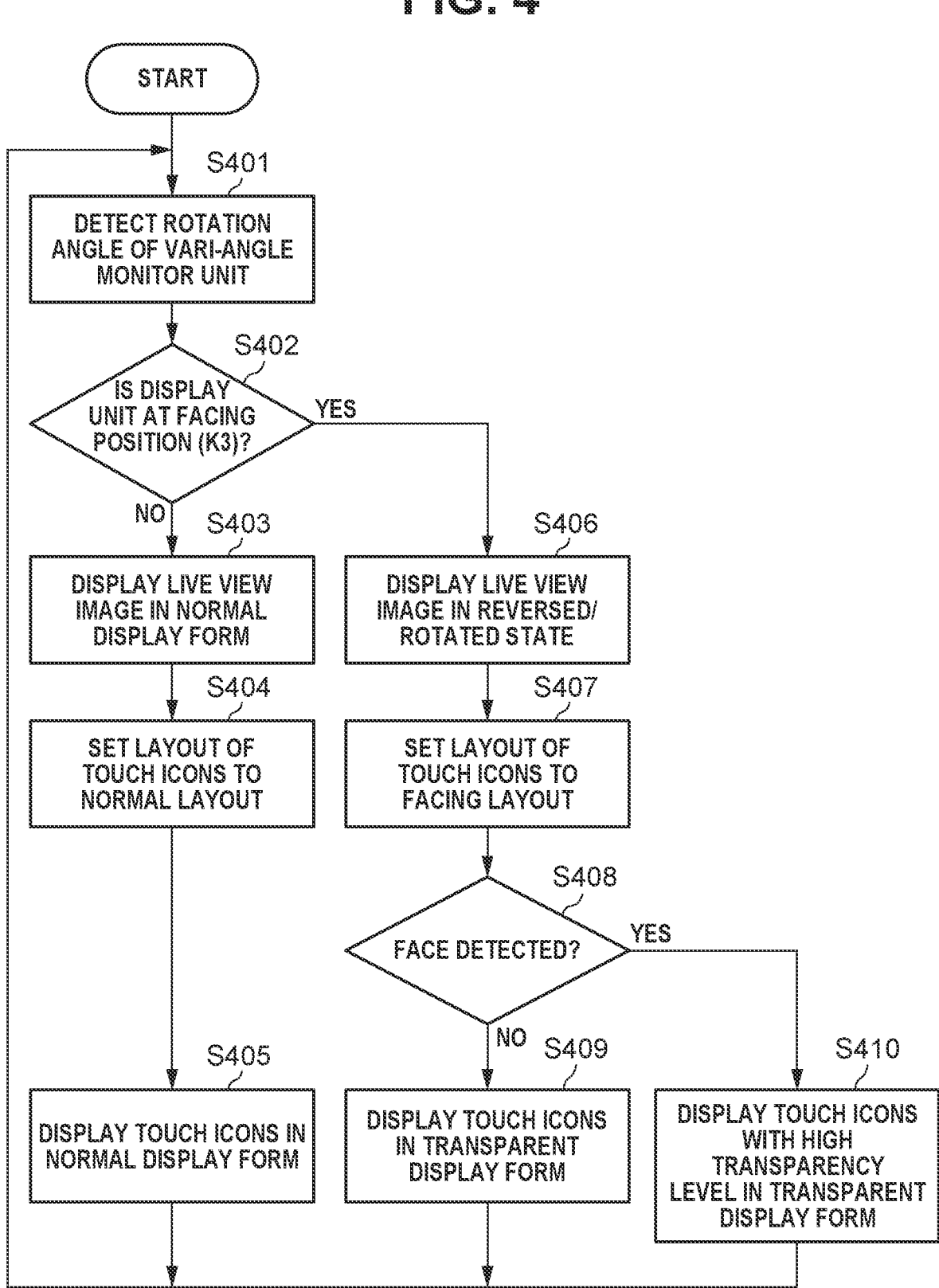
FIG. 4 is a flowchart illustrating display processing based on a rotation state of the vari-angle monitor unit.

FIG. 4 is a flowchart illustrating display processing based on the rotation state of the vari-angle monitor unit 113 according to the present exemplary embodiment. The system control unit 50 controls units of the digital camera 100 based on a program read out from the nonvolatile memory 56 and loaded into the system memory 52, so that the processing in this flowchart is performed. When the digital camera 100 operates in an image capturing mode, the processing in FIG. 4 is performed, and the processing in FIG. 4 ends in response to termination of the image capturing mode or power-off of the digital camera 100.

In step S401, the rotation detection unit 114 detects the rotation angle of the vari-angle monitor unit 113 with respect to the main body 100*a*.

In step S402, the system control unit 50 acquires information about the rotation angle detected by the rotation detection unit 114 in step S401, and determines whether the positional relationship between the vari-angle monitor unit 113 and the main body 100*a* indicates that the display unit 28 is at the facing position in which the display screen 28*a* of the display unit 28 faces the subject. The system control unit 50 determines that the display unit 28 is at the facing position in the state of K3 in FIG. 3, i.e., when the rotation angle of the display unit 28 detected by the rotation detection unit 114 is 180 degrees. However, the display unit 28 may be determined to be at the facing position, not only at 180 degrees, but also at a rotation angle of the display unit 28 of 150 degrees. A threshold for determining that the display unit 28 is at the facing position may be any degree if the threshold is greater than 90 degrees. At least when the rotation angle is in the range of 0 degrees (the state of K1) to 90 degrees (the state of K2), the system control unit 50 determines that the display unit 28 is not at the facing position. If the display unit 28 is not at the facing position (NO in step S402), the processing proceeds to step S403. If the display unit 28 is at the facing position (YES in step S402), the processing proceeds to step S406.

In step S403, the system control unit 50 displays a live view image in a normal display form on the display unit 28. In other words, the live view image acquired by the image pickup unit 22 and subjected to image processing by the image processing unit 24 is displayed without being vertically reversed/rotated 180 degrees. In step S404, the system control unit 50 sets the layout of touch icons to a normal layout. In step S405, the system control unit 50 sets the display of touch icons to a normal display (nontransparent display) form, and superimposes the touch icons on the live view image in the normal layout set in step S404 and the normal display form set in step S405, and displays the superimposed touch icons on the display screen of the display unit 28.

Figure 5:
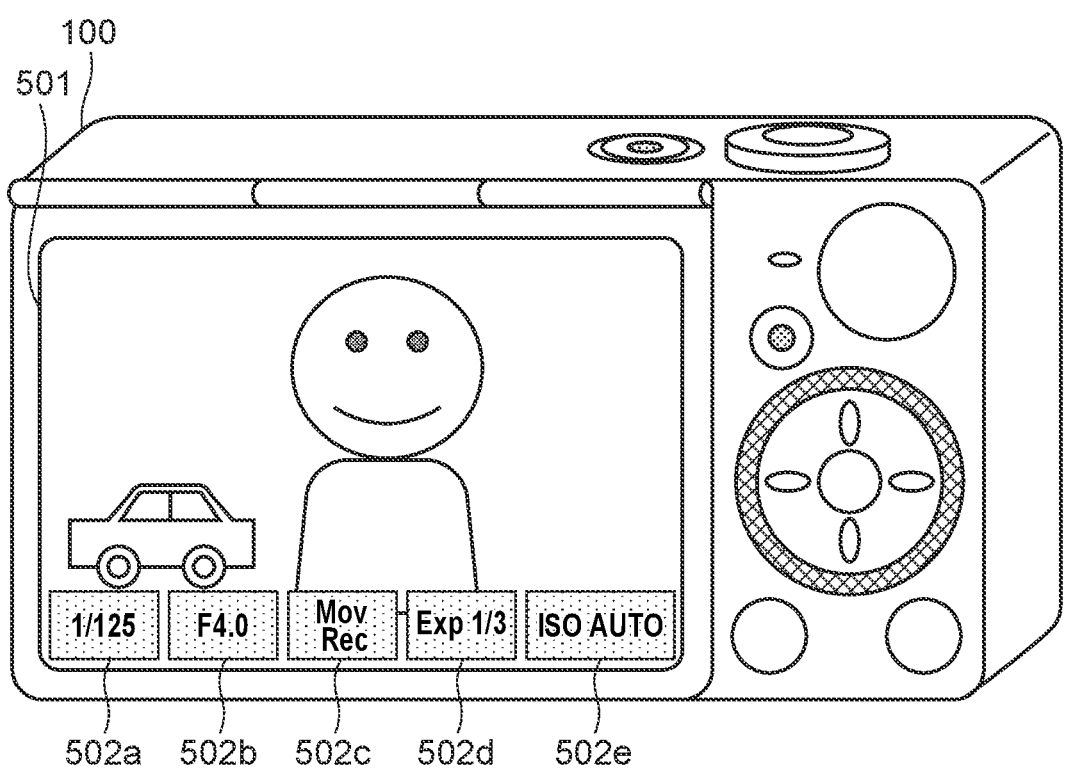
FIG. 5 illustrates a display example of a display unit when the vari-angle monitor unit is not at a facing position.

FIG. 5 illustrates a display example of the display unit 28 when it is determined that the display unit 28 is not at the facing position in step S402 and the processes in step S403 to step S405 are performed. An image 501 is a live view image displayed on the display unit 28 without performing reverse/rotation processing on the captured image acquired by the image pickup unit 22. Touch icons 502a to 502e is each a display item that receives touch operation. A function corresponding to each of these touch icons is carried out by touching the display position of the touch icon. The touch icon 502a is a touch icon for shutter speed (Tv), and the value of a shutter speed currently set in the digital camera 100 is displayed on the touch icon 502a. A setting screen for changing the shutter speed is displayed by touching this icon, allowing the shutter speed to be changed. The touch icon 502b is a touch icon for aperture value (Av), and an aperture value currently set in the digital camera 100 is displayed on this touch icon. A setting screen for changing the aperture value is displayed by touching this icon, allowing the aperture value to be changed. The touch icon 502c is a touch icon for giving an instruction to start/end moving image capturing, and an instruction to start/end moving image capturing can be given by touching this icon. The touch icon 502d is a touch icon for exposure correction (Exposure), and an exposure correction value currently set in the digital camera 100 is displayed on this touch icon. A setting screen for changing the exposure correction value is displayed by touching this icon, allowing the exposure correction value to be changed. The touch icon 502e is a touch icon for International Organization for Standards (ISO) sensitivity, and an ISO sensitivity currently set in the digital camera 100 is displayed on this icon. A setting screen for changing the ISO sensitivity is displayed by touching this icon, allowing the ISO sensitivity to be changed. For the setting screen to be displayed by touching each of the touch icons 502a, 502b, 502d, and 502e, for example, an object for changing the setting value is displayed in an area displaying each of the touch icons 502a to 502e in the live view image. The object for changing the setting value is displayed together with the live view image, allowing the user to change each of the setting values while confirming the live view image.

With the display unit 28 being not at the facing position, the touch icon 502a is displayed in the lower part of the live view image, i.e., in the end portion area on the lower side (the bottom side) in the top-bottom direction of the display unit 28, in a nontransparent manner, as illustrated in FIG. 5.

In this way, when it is determined that the display unit 28 is not at the facing position, the display illustrated in FIG. 5 is performed through the processes in step S403 to step S405, and the processing returns to step S401. While the rotation angle of the vari-angle monitor unit 113 remains unchanged with the display unit 28 being not at the facing position, the display in FIG. 5 continues. When the rotation angle of the vari-angle monitor unit 113 is changed and then it is determined that the display unit 28 is at the facing position, the processing proceeds to step S406, and the display changes to display with the display unit 28 being at the facing position.

In step S406, the system control unit 50 displays the live view image vertically reversed or rotated 180 degrees on the display unit 28, unlike the normal display of the live view image in step S403. At the facing position, the vari-angle monitor unit 113 is rotated 180 degrees, and thus, the up-down direction (the top-bottom direction) of the display unit 28 is opposite to the direction in the case at a rotation angle of 0 degrees. The live view image acquired by the image pickup unit 22 and subjected to the image processing by the image processing unit 24 is then vertically reversed or rotated 180 degrees and displayed, so that the top-bottom direction of the display unit 28 and the top-bottom direction of the live view image can be made the same.

In step S407, the system control unit 50 sets the layout of the touch icons to a facing layout. In step S408, the system control unit 50 acquires the result of face detection processing from the image processing unit 24, and determines whether a face is detected on the image (live view image). If no face is detected (NO in step S408), the processing proceeds to step S409. In step S409, the system control unit 50 sets the display of the touch icons to transparent display (a low transparency level). If a face is detected (YES in step S408), the processing proceeds to step S410. In step S410, the system control unit 50 sets the display of the touch icons to transparent display (a high transparency level). The system control unit 50 superimposes the touch icons on the live view image based on the facing layout set in step S407 and the display form of transparent display set in step S409 or step S410, and displays the superimposed touch icons on the display unit 28. If the display unit 28 is at the facing position, the touch icons are displayed in the transparent display form regardless of the result of the face detection in step S408, and if a face is detected, the touch icons are displayed with an increased transparency level.

Figure 6:
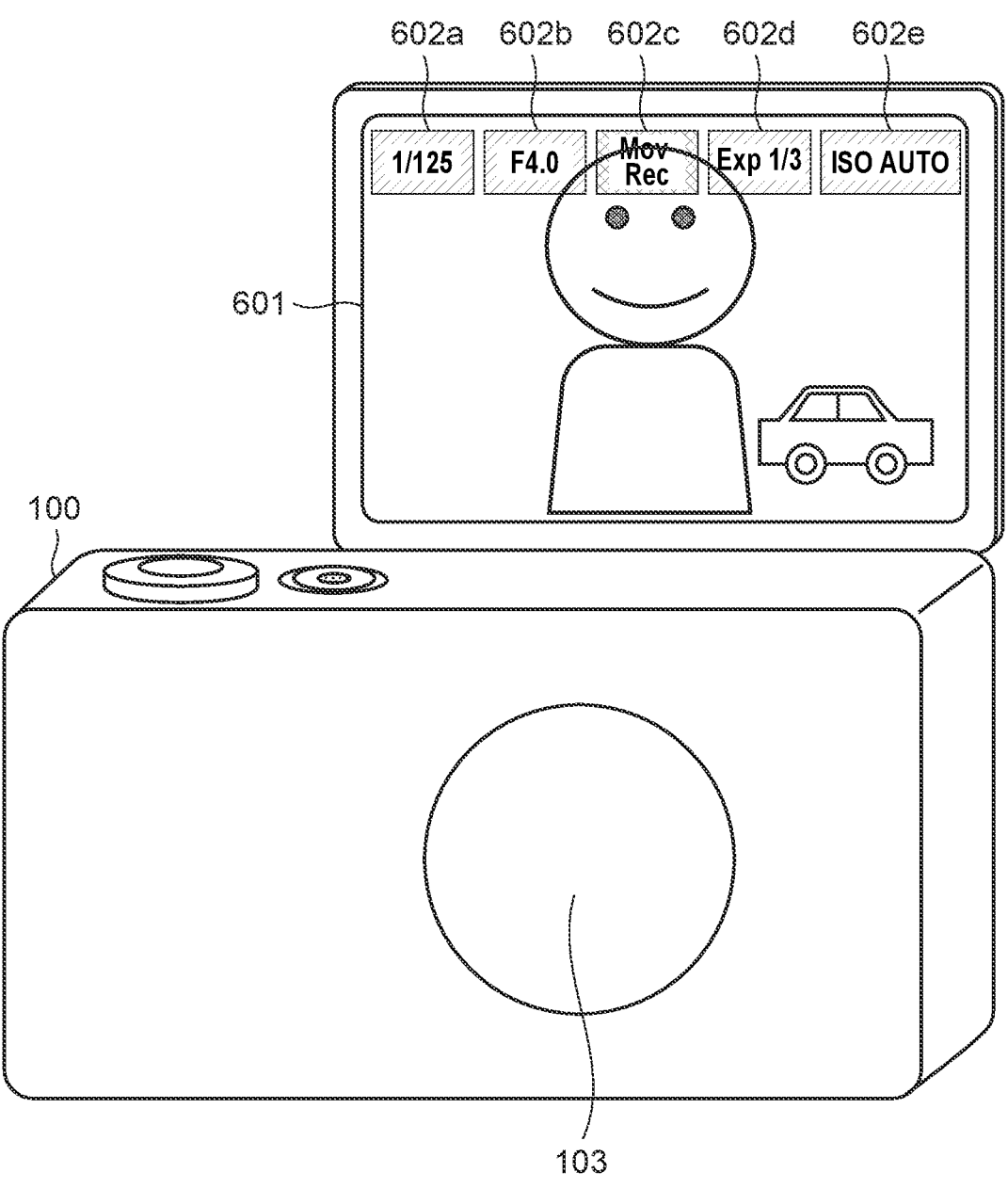
FIG. 6 illustrates a display example of the display unit when the vari-angle monitor unit is at the facing position.

FIG. 6 illustrates a display example of the display unit 28 when the display unit 28 is determined to be at the facing position in step S402. FIG. 6 illustrates a display example when a face is determined to be detected.

An image 601 is a live view image. In FIG. 6, the live view image is vertically reversed and displayed, so that the up-down direction (the top-bottom direction) of the live view image and the up-down direction of the display unit 28 are the same. Touch icons 602a to 602e correspond to the touch icons 502a to 502e in FIG. 5, respectively, but are different from the touch icons 502a to 502e in terms of display position and display form (transparency level). In FIG. 5, the touch icons 502a to 502e are arranged in the lower area at the lower end portion of the live view image. In contrast, at the facing position, the touch icons 602a to 602e are arranged in the end portion area on the upper side of the live view image, as illustrated in FIG. 6. If the touch icons are arranged in a lower area at the lower end portion of the live view image at the facing position in FIG. 6, it is difficult to operate the touch icons because the touch icons are close to the main body 100a. Thus, according to the present exemplary embodiment, the touch icons are arranged in the upper area at the upper end portion of the live view image as illustrated in FIG. 6, facilitating operation of the touch icons. However, the touch icons 602a to 602e arranged in the end portion area on the upper side of the live view image are likely to overlap the subject (in particular, the head or face area). For this reason, at the facing position, in addition to the layout of the touch icons, the display form of the touch icons is changed to facilitate check (view) of the subject. In FIG. 6, a face is detected, and the touch icons 602a to 602e are displayed at a high transparency level (a transparency level of 60%). If no face is detected, the touch icons 602a to 602e are displayed at a low transparency level (a transparency level of 30%). In FIG. 6, the touch icons are displayed at the increased transparency level to facilitate check of the subject, but instead of changing the transparency level, the display size of the touch icons may be reduced. Alternatively, the display size of the touch icons may be reduced at an increased transparency level.

Through repeat of such processes in step S401 to S410, the rotation of the vari-angle monitor unit 113 is detected, and the layout and display form (such as the transparency level and the display size) of the touch icons are changed depending on a change in the positional relationship between the vari-angle monitor unit 113 and the main body 100*a*.

In the above-described exemplary embodiment, at the facing position, the touch icons 602*a* to 602*e* are displayed in the transparent display form as illustrated in FIG. 6. In this case, the touch icons 602*b*, 602*c*, and 602*d* placed in the central portion of the display screen 28*a* are more likely to overlap the subject than the touch icons 602*a* and 602*e*. For this reason, the touch icons 602*b*, 602*c*, and 602*d* placed in the central portion may be displayed at a higher transparency level than the transparency level of the touch icons 602*a* and 602*e* placed near corners of the display screen. Alternatively, the touch icons 602*b*, 602*c*, and 602*d* may be displayed in the transparent display form, and the touch icons 602*a* and 602*e* may be displayed in the nontransparent display form. Further, while all the touch icons 602*a* to 602*e* are displayed at a high transparency level in step S410, only a touch icon overlapping the position of a face detected by the face detection processing may be displayed at a high transparency level, and other touch icons may be displayed at a low transparency level.

In the above-described exemplary embodiment, at the facing position, the transparency level of the touch icons is changed depending on the result of the face detection. However, the transparency level may be varied between when the display unit is at the facing position and when the display unit is not at the facing position, instead of changing the transparency level of the touch icons depending on the result of the face detection. In this case, the touch icons are displayed at a high transparency level with the display unit being at the facing position, whereas the touch icons are displayed at a low transparency level with the display unit being not at the facing position.

In the above-described exemplary embodiment, the nontransparent display form is used with the display unit being not at the facing position, whereas the transparent display form is used to facilitate view of the subject with the display unit being at the facing position. However, the touch icons may be displayed at a low transparency level (a transparency level of 25%) with the display unit being not at the facing position, whereas the touch icons may be displayed at a high transparency level (a transparency level of 50%) to facilitate view (check) of the subject with the display unit being at the facing position. Further, when a face is detected, the touch icons may be displayed at a higher transparency level (a transparency level of 75%), or may be displayed at a high transparency level (a transparency level of 50%) and a smaller icon size.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-183492, filed Nov. 16, 2022, which is hereby incorporated by reference herein in its entirety.

What is claimed is:

1. An image pickup apparatus comprising:

a display unit that can change a position with respect to a main body of the image pickup apparatus and that include a display screen that can detect a touch operation performed thereon; and a controller that performs control to display a predetermined item on the display screen, the displayed predetermined item being superimposed on a captured image and able to receive the touch operation; and a detector that detects a face in the captured image displayed together with the predetermined item, wherein in a case where the display unit is positioned to have a first positional relationship relative to the main body of the image pickup apparatus, the controller performs control to place the predetermined item superimposed on the captured image at a display position in a first layout and display the predetermined item in a first display form without causing the detector to execute face detection, and in a case where the display unit is positioned to have a second positional relationship relative to the main body of the image pickup apparatus, the controller causes the detector to execute face detection and, in a case where no face is detected by the detector, performs control to place the predetermined item at a display position in a second layout different from the first layout and display the predetermined item in a second display form in which a transparency level of the predetermined item is higher than in the first display form, and in a case where the face is detected by the detector, performs control to place the predetermined item at the display position in the second layout and display the predetermined item in a third display form in which the capture image is more easily viewed than in the second display form.

2. The image pickup apparatus according to claim 1, wherein the predetermined item is displayed in a nontransparent manner in the first display form and displayed in a transparent manner in the second display form.

3. The image pickup apparatus according to claim 1, wherein a display size of the predetermined item in the second display form is smaller than a display size of the predetermined item in the first display form.

4. The image pickup apparatus according to claim 1, wherein the predetermined item comprises a plurality of items, wherein in the first positional relationship, the controller performs control to place the plurality of items in the first layout and display the plurality of items in the first display form, and in the second positional relationship, in the case where no face is detected by the detector, the controller performs control to place the plurality of items in the second layout, display a specific item among the plurality of items in the second display form, and display another item among the plurality of items in the first display form.

5. The image pickup apparatus according to claim 1, wherein the predetermined item comprises a plurality of items, and wherein in the first positional relationship, the controller performs control to display the plurality of items in the first layout and the first display form, and in the second positional relationship, in the case where the face is detected by the detector, the controller performs control to place the plurality of items in the second layout, place an item that is other than a specific item among the plurality of items in the second display form, and display the specific item in a third display form, the third display form in which the image displayed together with the specific item is more easily viewed than in the second display form.

6. The image pickup apparatus according to claim 4, wherein the specific item is an item placed in a central portion of the display screen, and the other item is an item placed near a corner of the display screen.

7. The image pickup apparatus according to claim 1, wherein the display unit is configured to change a position with respect to the image pickup apparatus, by turning about a rotation shaft disposed on back upper side of the image pickup apparatus, and wherein in the first positional relationship the display screen faces in a backward direction of the image pickup apparatus, and in the second positional relationship the display screen faces in an image capturing direction of the image pickup apparatus.

8. The image pickup apparatus according to claim 7, wherein, in the second positional relationship, the controller performs control to cause the display unit to display the captured image subjected to vertical reverse or 180-degree rotation on the display screen when compared with the first positional relationship.

9. The image pickup apparatus according to claim 8, wherein the first layout is a layout having the predetermined item placed in a lower area of the captured image, and the second layout is a layout having the predetermined item placed in an upper area of the captured image.

10. The image pickup apparatus according to claim 1, wherein the first layout is a layout having the predetermined item placed in a lower area of the captured image, and the second layout is a layout having the predetermined item placed in an upper area of the captured image.

11. A control method for an image pickup apparatus including a display unit that can change a position with respect to a main body of the image pickup apparatus and that includes a display screen that can detect, a touch operation performed thereon, the control method comprising:

displaying, on the display screen, a predetermined item, the displayed predetermined item being superimposed on a captured image and able to receive the touch operation, and detecting a face in the captured image displayed together with the predetermined item, wherein the displaying includes, in case where the display unit is positioned to have a first positional relationship relative to the main body of the image pickup apparatus, placing the predetermined item superimposed on the captured image at a display position in a first layout, and display the predetermined item in a first display form without causing the detector to execute face detection, and in a case where the display unit is positioned to have a second positional relationship relative to the main body of the image pickup apparatus, the controller causes the detector to execute face detection and, in a case where no face is detected by the detector, placing the predetermined item at a display position in a second layout different from the first layout, and display the predetermined item in a second display form in which with a transparency level of the predetermined item is higher than in the first display form and in a case where the face is detected by the detector, performs control to place the predetermined item at the display position in the second layout and display the predetermined item in a third display form in which the capture image is more easily viewed than in the second display form.

12. A non-transitory computer-readable storage medium that stores instructions that, when executed by one or more processors of an image pickup apparatus causes a control method to be executed, the control method comprising according to claim 11.

* * * * *